United States Patent
Wang et al.

(10) Patent No.: US 11,689,989 B2
(45) Date of Patent: Jun. 27, 2023

(54) METHOD AND SYSTEM OF AUTOMATICALLY CONNECTING A WIRELESS DEVICE TO NETWORK VIA PHONE

(71) Applicant: Beken Corporation, Shanghai (CN)

(72) Inventors: Weifeng Wang, Shanghai (CN); Xiaoliang Yue, Shanghai (CN); Ji Jiang, Shanghai (CN)

(73) Assignee: Beken Corporation, Shanghai (CN)

( * ) Notice: Subject to any disclaimer, the term of this patent is extended or adjusted under 35 U.S.C. 154(b) by 159 days.

(21) Appl. No.: 17/379,954

(22) Filed: Jul. 19, 2021

(65) Prior Publication Data

US 2023/0050968 A1     Feb. 16, 2023

(30) Foreign Application Priority Data

Jul. 9, 2021   (CN) .......................... 202110777961.3

(51) Int. Cl.
| | |
|---|---|
| *H04W 4/00* | (2018.01) |
| *H04W 48/10* | (2009.01) |
| *H04W 48/04* | (2009.01) |
| *H04W 12/47* | (2021.01) |
| *H04B 17/318* | (2015.01) |

(52) U.S. Cl.
CPC ............ *H04W 48/10* (2013.01); *H04B 17/318* (2015.01); *H04W 12/47* (2021.01); *H04W 48/04* (2013.01)

(58) Field of Classification Search
CPC ...... H04W 12/47; H04W 48/08; H04W 48/10; H04B 17/318
See application file for complete search history.

(56) References Cited

U.S. PATENT DOCUMENTS

| | | | | |
|---|---|---|---|---|
| 8,116,285 | B1* | 2/2012 | Barnum | H04W 28/18 370/338 |
| 10,117,286 | B1* | 10/2018 | Jorgovanovic | H04L 65/80 |
| 2014/0094162 | A1* | 4/2014 | Heo et al. | H04W 72/21 455/422.1 |

(Continued)

FOREIGN PATENT DOCUMENTS

| | | | |
|---|---|---|---|
| CN | 113498045 | A * | 10/2021 |
| CN | 114339693 | A * | 4/2022 |

(Continued)

*Primary Examiner* — Chi H Pham
*Assistant Examiner* — Elisabeth Benoit Magloire
(74) *Attorney, Agent, or Firm* — Schwegman Lundberg & Woessner P. A.

(57) ABSTRACT

A method includes responsive to a device sensing a phone being adjacent to the device, triggering the device and the phone in a preliminary communication mode; periodically broadcasting by the device in the preliminary communication mode a broadcast message (P2) with a unique identification; detecting a strength of the broadcast message (P2) by the phone; responsive to detecting the strength of the broadcast message (P2) greater than a first threshold (T1), establishing a restricted wireless connection between the phone and the device; transmitting packages between the device and the phone via the restricted wireless connection; detecting strengths of the packages; and responsive to detecting strengths of the packages respectively greater than the first threshold (T1) and a second threshold (T2), establishing a complete wireless communication between the device and the phone so as to connect the device to the network via the phone.

20 Claims, 4 Drawing Sheets

(56) References Cited

U.S. PATENT DOCUMENTS

| | | | | |
|---|---|---|---|---|
| 2014/0195934 | A1* | 7/2014 | Harrison | H04L 65/60 |
| | | | | 715/758 |
| 2015/0195857 | A1* | 7/2015 | Pan et al. | H04W 4/80 |
| | | | | 455/41.3 |
| 2015/0281364 | A1* | 10/2015 | Connolly | G06Q 10/06 |
| | | | | 709/217 |
| 2016/0021485 | A1* | 1/2016 | Sallas et al. | H04W 40/02 |
| | | | | 455/41.3 |
| 2016/0073172 | A1* | 3/2016 | Sharples | H04N 21/858 |
| | | | | 725/80 |
| 2017/0366956 | A1* | 12/2017 | Yoshida et al. | H04W 40/244 |
| 2020/0075032 | A1* | 3/2020 | Joseph et al. | G10L 19/002 |
| 2020/0160332 | A1* | 5/2020 | Somasundaram | H04W 4/24 |
| 2020/0178250 | A1* | 6/2020 | Freed et al. | H04W 72/542 |
| 2020/0404977 | A1* | 12/2020 | Chen et al. | H01M 50/247 |

FOREIGN PATENT DOCUMENTS

WO    2019237263  A1*  12/2019

* cited by examiner

METHOD AND SYSTEM OF AUTOMATICALLY CONNECTING A WIRELESS DEVICE TO NETWORK VIA PHONE

CROSS REFERENCE TO RELATED APPLICATIONS

This application claims priority to and incorporates by reference Chinese Patent Application Number 202110777961.3 filed Jul. 9, 2021.

TECHNICAL FIELD

The present application relates to a method and a system of automatically connecting a wireless device to a network via a phone.

BACKGROUND

Nowadays, wireless smart devices (such as Bluetooth light bulbs, WiFi sockets, and webcams), which can be connected to a network or a cloud, are widely used. In order to connect a wireless smart device without a display to a network, a smart phone is typically used to help the wireless device obtain necessary information of the network, and some user operations (such as scanning the wireless device, and entering network information) via the smart phone are typically needed. However, the user operations via the smart phone can be cumbersome, time-consuming, and error-prone, and may lead to a failure in connecting the smart device to the network via the phone.

BRIEF DESCRIPTION

According to an embodiment, a method of automatically connecting a wireless device to a network via a phone may comprise: responsive to the device sensing the phone being adjacent to the device, triggering the device and the phone to be set in a preliminary communication mode; periodically broadcasting, by the device in the preliminary communication mode, a broadcast message with a unique identification; detecting a strength of the broadcast message by the phone responsive to receiving the broadcast message; responsive to detecting the strength of the broadcast message greater than a first threshold, automatically establishing by the phone a restricted wireless connection between the phone and the device; transmitting packages between the device and the phone via the restricted wireless connection, wherein at least a first package of the packages is transmitted from the device to the phone, and wherein at least a second package of the packages is transmitted from the phone to the device; detecting strengths of the packages, wherein a first strength of the first package is detected by the phone, and a second strength of the second package is detected by the device; and responsive to detecting the first strength of the first package greater than the first threshold and the second strength of the second package greater than a second threshold, establishing a complete wireless communication between the device and the phone to connect the device to a network via the phone.

According to an embodiment, a wireless device may comprise a sensor to sense a phone being adjacent to the device; a trigger to set the device in a preliminary communication mode responsive to sensing the phone adjacent to the device; a broadcaster to periodically broadcast a broadcast message with a unique identification by the device in the preliminary communication mode, wherein responsive to detecting a strength of the broadcast message greater than a first threshold, the phone establishes a restricted wireless connection between the phone and the device; a transmitter to transmit at least a first package to the phone via the restricted wireless connection, wherein the phone transmits at least a second package to the device via the restricted wireless connection; and a detector to detect a first strength of the first package, wherein the phone detects a second strength of the second package, and wherein responsive to detecting the first strength of the first package and the second strength of the second package respectively greater than the first threshold and a second threshold, a complete wireless communication is established between the device and the phone so as to connect the device to a network via the phone.

According to an embodiment, a system may comprise: a memory that stores instructions; and one or more processors configured by the instructions to perform operations comprising: responsive to a device sensing a phone being adjacent to the device, triggering the device and the phone to be set in a preliminary communication mode; periodically broadcasting, by the device in the preliminary communication mode, a broadcast message with a unique identification; detecting a strength of the broadcast message by the phone responsive to receiving the broadcast message; responsive to detecting the strength of the broadcast message greater than a first threshold, automatically establishing by the phone a restricted wireless connection between the phone and the device; transmitting packages between the device and the phone via the restricted wireless connection, wherein at least a first package is transmitted from the device to the phone, and wherein at least a second package is transmitted from the phone to the device; detecting strengths of the packages, wherein a first strength of the first package is detected by the phone, and a second strength of the second package is detected by the device; and responsive to detecting the first strength of the first package greater than the first threshold and the second strength of the second package greater than a second threshold, establishing a complete wireless communication between the device and the phone so as to connect the device to a network via the phone.

BRIEF DESCRIPTION OF THE DRAWINGS

Non-limiting and non-exhaustive embodiments of the present application are described with reference to the following figures, wherein like reference numerals refer to like parts throughout the various views unless otherwise specified.

DETAILED DESCRIPTION OF THE ILLUSTRATED EMBODIMENTS

Figure 1A:
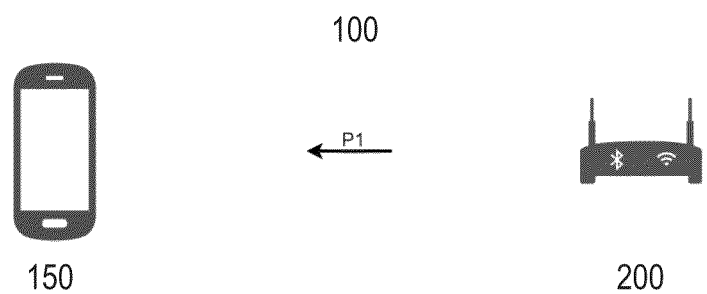
FIGS. 1A-1E are diagrams illustrating a method of automatically connecting a wireless device to a network via a phone according to an embodiment.

Various aspects and examples of the application will now be described. The following description provides specific details for a thorough understanding and enabling description of these examples. Those skilled in the art will understand, however, that the application may be practiced without many of these details.

Additionally, some well-known structures or functions may not be shown or described in detail, so as concise purpose and to avoid unnecessarily obscuring the relevant description.

The terminology used in the description presented below is intended to be interpreted in its broadest reasonable manner, even though it is being used in conjunction with a detailed description of certain specific examples of the application. Certain terms may even be emphasized below, however, any terminology intended to be interpreted in any restricted manner will be overtly and specifically defined as such in this Detailed Description section. The following are the definitions of some abbreviations and acronyms used in the description, such as, SSID: Service Set Identifier; BLE: Bluetooth; and NFC: Near Field Communication.

Without loss of generality, reference will be made to illustrative embodiments by taking a method of automatically pairing a wireless device and a phone as example. Those of ordinary skills in the art understand that this is only to describe the application clearly and adequately, rather than limit the scope of the application, which is defined by the appended claims.

FIGS. 1A-1E are diagrams illustrating a method 100 of automatically connecting a wireless device 200 (that will be explained in more detail with respect to FIG. 2) to a network (not shown in the drawings) via a BLE-equipped device, such as a cell phone 150, according to an embodiment.

According to an embodiment, with a pairing App of the phone 150 set in an active status, the phone 150 is placed adjacent to the device 200 in order to satisfy a first pairing condition, and thus the device 200 and the phone 150 can be automatically triggered to be set in a preliminary communication mode. Then, based on an analysis conducted by the phone 150 on a periodically broadcast message P2 with a unique identification from the device 200, a restricted wireless connection mode can be established between the phone 150 and the device 200. After that, based on a further analysis conducted by the device 200 and the phone 150 on packages that are transmitted between the phone 150 and the device 200, a complete wireless connection mode can be established between the phone 150 and the device 200 in case that a second paring condition is detected and satisfied. The process of automatically connecting the device 200 to a network or a cloud via the phone 150 will be explained in more detail below with reference to FIGS. 1A-1E.

Referring to FIG. 1A, while the device 200 being away from the phone 150, the device 200 may periodically broadcast a broadcast package P1 to inform the phone 150, and other devices (not shown in the drawings), that the device 200 is not in a preliminary communication mode yet.

Figure 1B:
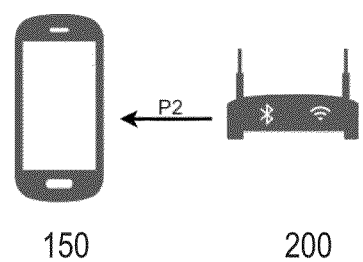

Referring to FIG. 1B, responsive to the phone 150 being detected adjacent to the device 200, the device 200 and the phone 150 are both automatically triggered to be set in a preliminary communication mode. In the preliminary communication mode, the device 200 may periodically broadcast a broadcast message P2 with a unique identification. The broadcast message P2 with the unique identification is different from the broadcast message P1.

Figure 1C:
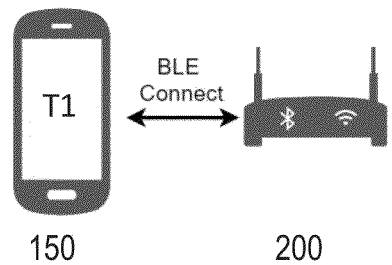

Referring to FIG. 1C, responsive to receiving the broadcast message P2 from the device 200, the phone 150 may detect a strength of the broadcast message P2. In an embodiment, responsive to detecting the strength of the broadcast message P2 greater than a first threshold T1 stored in the phone 150, the phone 150 may automatically establish a restricted wireless connection between the phone 150 and the device 200. The restricted wireless connection can be, but not limited to, a Bluetooth (BLE) connection or a WiFi connection.

Figure 1D:
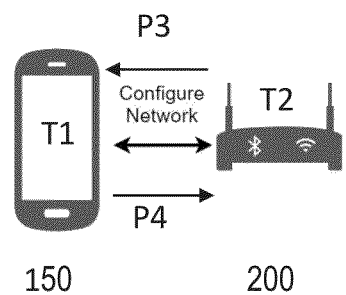

Referring to FIG. 1D, after the restricted wireless connection is established, the device 200 and the phone 150 may transmit packages to each other. For example, the device 200 may transmit multiple packages including at least a package P3 to the phone 150, and the phone 150 may transmit multiple packages including at least a package P4 to the device 200.

In an embodiment, the phone 150 and the device 200 may detect strengths of the received packages. For example, the phone 150 may detect a strength of the package P3 received from the device 200 and compare with a threshold T1, and the device 200 may detect a strength of the package P4 received from the phone 150 and compare with a threshold T2. The threshold T1 may be stored in the phone 150, and the threshold T2 may be stored in the device 200, for example.

In an embodiment, responsive to detecting the strength of the package P3 greater than the threshold T1 and detecting the strength of the package P4 greater than a threshold T2, a complete wireless communication is established between the device 200 and the phone 150. In an embodiment, the complete wireless communication may include, but not limited to, a WiFi connection.

In an embodiment, the package P3 transmitted from the device 200 to the phone 150 may include a data frame configured to start a WiFi network configuration.

In an embodiment, the package P4 transmitted from the phone 150 to the device 200 may include a data frame configured to start a WiFi network configuration.

In an embodiment, responsive to detecting by the phone 150 the strength of the package P3 less than the threshold T1, an attempt of establishing the complete wireless communication between the device 200 and the phone 150 is paused.

In an embodiment, responsive to detecting by the device 200 the strength of the package P4 less than the threshold T2, an attempt of establishing the complete wireless communication between the device 200 and the phone 150 is paused.

Figure 1E:
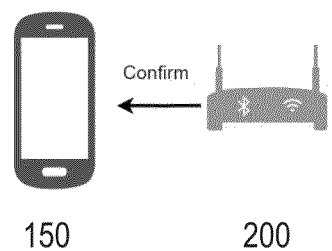

Referring to FIG. 1E, responsive to establishing the complete wireless communication, the device 200 may send a confirmation message to the phone 150 to confirm the complete wireless communication. In an embodiment, responsive to establishing the complete wireless communication, the device 200 is automatically connected to a router of a network (not shown in the drawings) via the phone 150.

In this way, the device 200 can be automatically connected to the network via the phone 150, without a need of scanning the device 200 or entering some information (such as an SSIN and a password) of the network, for example. The pairing of the device and the phone is convenient, accurate, and timesaving, and thus may lead to better user satisfaction.

Figure 2:
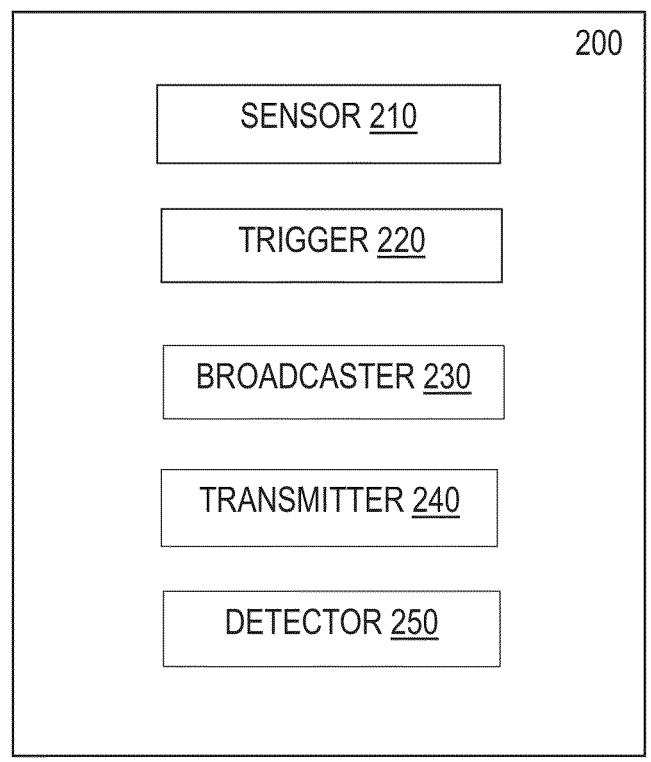
FIG. 2 is a diagram illustrating a wireless device according to an embodiment.

FIG. 2 is a diagram illustrating a wireless device 200 according to an embodiment. The device 200 may include a sensor 210, a trigger 220, a broadcaster 230, a transmitter 240, and a detector 250.

In an embodiment, the sensor 210 can be configured to sense a phone 150 that is adjacent to the device 200. Responsive to sensing the phone 150 adjacent to the device 200, the trigger 220 can be configured to set the device 200 in a preliminary communication mode.

In the preliminary communication mode, the broadcaster 230 can be configured to periodically broadcast a broadcast message P2 (referring to e.g., FIG. 1B) with a unique identification by the device 200. Responsive to detecting a strength of the broadcast message P2 greater than a first threshold T1 (referring to e.g., FIG. 1C), the phone 150 may establish a restricted wireless connection between the phone 150 and the device 200.

In an embodiment, the transmitter 240 can be configured to transmit multiple packages including at least a package P3 to the phone 150 via the restricted wireless connection. The phone 150 may also transmit multiple packages including at least a package P4 to the device 200 via the restricted wireless connection.

In an embodiment, the detector 250 can be configured to detect a strength of the package P3. The phone 150 may also detect a strength of the package P4. In an embodiment, responsive to detecting the strengths of the packages P3 and P4 respectively greater than the strength thresholds T1 and T2, a complete wireless communication may be established between the device 200 and the phone 150. After the complete wireless communication is established, the device 200 is automatically connected to a router of a network (not shown in the drawings) and thus connected to the network via the phone 150.

In an embodiment, the strength threshold T1 may be stored in the phone 150, and the second strength threshold T2 may be stored in the device 200.

In an embodiment, while no phone 150 is sensed adjacent to the device 200, the device 200 may periodically broadcast a broadcast package P1 to inform other devices (including the phone 150) that the device 200 is not in the preliminary communication mode yet.

In an embodiment, the device 200 may sense within sensor range (such as within one foot) that the phone 150 is adjacent to the device 200 as a result of a capacitance detection. The device 200 may also sense within sensor range (such as within sight range) that phone 150 is adjacent to the device 200 as a result of an infra-red strength detection. The device 200 may also sense within sensor range (such as within 5 feet) that phone 150 is adjacent to the device 200 as a result of a near-field-communication (NFC) inductance detection. The device 200 may sense within sensor range that phone 150 is adjacent to the device 200 as a result of a wireless signal travelling time detection.

Figure 3:
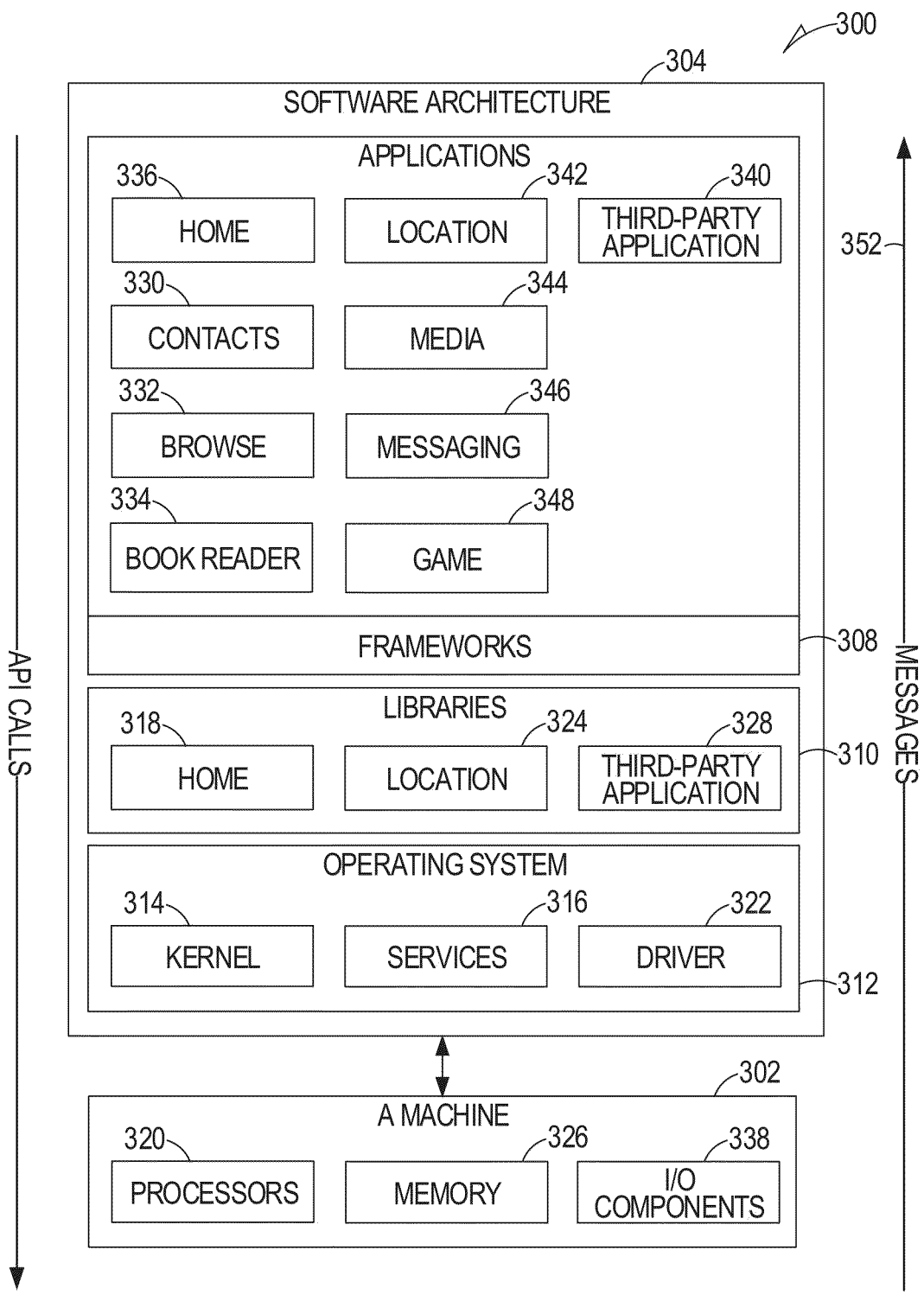
FIG. 3 is a block diagram showing a software architecture within which examples may be implemented.

FIG. 3 is a block diagram 300 illustrating a software architecture 304, which can be installed on any one or more of the wireless smart devices (such as a smart socket) described herein. The software architecture 304 is supported by hardware such as a machine 302 that includes processors 320, memory 326, and I/O components 338. In this example, the software architecture 304 can be conceptualized as a stack of layers, where each layer provides a particular functionality. The software architecture 304 includes layers such as an operating system 312, libraries 310, frameworks 308, and applications 306. Operationally, the applications 306 invoke API calls 350 through the software stack and receive messages 352 in response to the API calls 350.

The operating system 312 manages hardware resources and provides common services. The operating system 312 includes, for example, a kernel 314, services 316, and drivers 322. The kernel 314 acts as an abstraction layer between the hardware and the other software layers. For example, the kernel 314 provides memory management, processor management (e.g., scheduling), component management, networking, and security settings, among other functionality. The services 316 can provide other common services for the other software layers. The drivers 322 are responsible for controlling or interfacing with the underlying hardware. For instance, the drivers 322 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 310 provide a common low-level infrastructure used by the applications 306. The libraries 310 can include system libraries 318 (e.g., C standard library) that provide functions such as memory allocation functions, string manipulation functions, mathematic functions, and the like. In addition, the libraries 310 can include API libraries 324 such as media libraries (e.g., libraries to support presentation and manipulation of various media formats such as Moving Picture Experts Group-4 (MPEG4), Advanced Video Coding (H0.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 310 can also include a wide variety of other libraries 328 to provide many other APIs to the applications 306.

The frameworks 308 provide a common high-level infrastructure that is used by the applications 306. For example, the frameworks 308 provide various graphical user interface (GUI) functions, high-level resource management, and high-level location services. The frameworks 308 can provide a broad spectrum of other APIs that can be used by the applications 306, some of which may be specific to a particular operating system or platform.

In an example, the applications 306 may include a home application 336, a contacts application 330, a browser application 332, a book reader application 334, a location application 342, a media application 344, a messaging application 346, a game application 348, and a broad assortment of other applications such as a third-party application 340. The applications 306 are programs that execute functions defined in the programs. Various programming languages can be employed to create one or more of the applications 306, structured in a variety of manners, such as object-oriented programming languages (e.g., Objective-C, Java, or C++) or procedural programming languages (e.g., C or assembly language). In a specific example, the third-party application 340 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 340 can invoke the API calls 350 provided by the operating system 312 to facilitate functionality described herein.

Features and aspects of various embodiments may be integrated into other embodiments, and embodiments illustrated in this document may be implemented without all of the features or aspects illustrated or described.

One skilled in the art will appreciate that although specific examples and embodiments of the system and methods have been described for purposes of illustration, various modifications can be made without deviating from the spirit and scope of the present application. Moreover, features of one embodiment may be incorporated into other embodiments, even where those features are not described together in a single embodiment within the present document. Accordingly, the application is described by the appended claims.

What is claimed is:

1. A method of automatically connecting a wireless device to a network via a phone, comprising:
   responsive to the device sensing the phone being adjacent to the device, triggering the device and the phone to be set in a preliminary communication mode;
   periodically broadcasting, by the device in the preliminary communication mode, a broadcast message (P2) with a unique identification;
   detecting a strength of the broadcast message (P2) by the phone responsive to receiving the broadcast message (P2);
   responsive to detecting the strength of the broadcast message (P2) greater than a first threshold (T1), automatically establishing by the phone a restricted wireless connection between the phone and the device;
   transmitting packages between the device and the phone via the restricted wireless connection, wherein at least a first package (P3) of the packages is transmitted from the device to the phone, and wherein at least a second package (P4) of the packages is transmitted from the phone to the device;
   detecting strengths of the packages, wherein a first strength of the first package (P3) is detected by the phone, and a second strength of the second package (P4) is detected by the device; and
   responsive to detecting the first strength of the first package (P3) greater than the first threshold (T1) and the second strength of the second package (P4) greater than a second threshold (T2), establishing a complete wireless communication between the device and the phone to connect the device to a network via the phone.

2. The method of claim 1, further comprising responsive to establishing the complete wireless communication, sending a confirmation from the device to the phone to confirm the complete wireless communication.

3. The method of claim 2, further comprising responsive to establishing the complete wireless communication, connecting the device to a router of the network via the phone.

4. The method of claim 1, wherein the first package (P3) transmitted from the device to the phone comprises at least a first frame configured to start a WiFi network configuration.

5. The method of claim 1, wherein the second package (P4) transmitted from the phone to the device comprises at least a second frame configured to start a WiFi network configuration.

6. The method of claim 1, wherein while the device being away from the phone, the device periodically broadcasts another broadcast package (P1) different from the broadcast package (P2) to inform that the device is not in the preliminary communication mode.

7. The method of claim 1, wherein the restricted wireless connection comprises a Bluetooth connection or a WiFi connection.

8. The method of claim 1, wherein the complete wireless communication comprises a WiFi connection.

9. The method of claim 1, wherein responsive to detecting by the phone the first strength of the first package (P3) less than the first threshold (T1), an attempt of establishing the complete wireless communication between the device and the phone is paused.

10. The method of claim 1, wherein responsive to detecting by the device the second strength of the second package (P4) less than the second threshold (T2), an attempt of establishing the complete wireless communication between the device and the phone is paused.

11. A wireless device comprising:
   a sensor to sense a phone being adjacent to the device;
   a trigger to set the device in a preliminary communication mode responsive to sensing the phone adjacent to the device;
   a broadcaster to periodically broadcast a broadcast message (P2) with a unique identification by the device in the preliminary communication mode, wherein responsive to detecting a strength of the broadcast message (P2) greater than a first threshold (T1), the phone establishes a restricted wireless connection between the phone and the device;
   a transmitter to transmit at least a first package (P3) to the phone via the restricted wireless connection, wherein the phone transmits at least a second package (P4) to the device via the restricted wireless connection; and
   a detector to detect a first strength of the first package (P3), wherein the phone detects a second strength of the second package (P4), and wherein responsive to detecting the first strength of the first package (P3) and the second strength of the second package (P4) respectively greater than the first threshold (T1) and a second threshold (T2), a complete wireless communication is established between the device and the phone so as to connect the device to a network via the phone.

12. The wireless device of claim 11, wherein the first strength threshold (T1) is stored in the phone, and wherein the second strength threshold (T2) is stored in the device.

13. The wireless device of claim 11, wherein while no phone is sensed adjacent to the device, the device periodically broadcasts another broadcast package (P1) to inform that the device is not in the preliminary communication mode yet.

14. The wireless device of claim 11, wherein the phone adjacent to the device is sensed as a result of a capacitance detection.

15. The wireless device of claim 11, wherein the phone adjacent to the device is sensed as a result of an infra-red strength detection.

16. The wireless device of claim 11, wherein the phone adjacent to the device is sensed as a result of a near-field-communication (NFC) inductance detection.

17. The wireless device of claim 11, wherein the phone adjacent to the device is sensed as a result of a wireless signal travelling time detection.

18. A system comprising:
   a memory that stores instructions; and
   one or more processors configured by the instructions to perform operations comprising:
   responsive to a device sensing a phone being adjacent to the device, triggering the device and the phone to be set in a preliminary communication mode;
   periodically broadcasting, by the device in the preliminary communication mode, a broadcast message (P2) with a unique identification;
   detecting a strength of the broadcast message (P2) by the phone responsive to receiving the broadcast message (P2);
   responsive to detecting the strength of the broadcast message (P2) greater than a first threshold (T1), automatically establishing by the phone a restricted wireless connection between the phone and the device;
   transmitting packages between the device and the phone via the restricted wireless connection, wherein at least a first package (P3) is transmitted from the device to the phone, and wherein at least a second package (P4) is transmitted from the phone to the device;

detecting strengths of the packages, wherein a first strength of the first package (P3) is detected by the phone, and a second strength of the second package (P4) is detected by the device; and responsive to detecting the first strength of the first package (P3) greater than the first threshold (T1) and the second strength of the second package (P4) greater than a second threshold (T2), establishing a complete wireless communication between the device and the phone so as to connect the device to a network via the phone.

19. The system of claim 18, wherein the operations further comprise sending a confirmation from the device to the phone to confirm the complete wireless communication.

20. The system of claim 18, wherein the operations further comprise wirelessly connecting the device via the phone to a router of the network.

\* \* \* \* \*